(12) United States Patent
Edmonds et al.

(10) Patent No.: US 12,537,835 B1
(45) Date of Patent: Jan. 27, 2026

(54) TYPED SECURITY INFORMATION AND EVENT MANAGEMENT (SIEM) TRIAGE PROCESSING COMPONENTS SYSTEM

(71) Applicant: Morgan Stanley Services Group Inc., New York, NY (US)

(72) Inventors: Joseph T. Edmonds, Ellicott City, MD (US); Russell A. Moriarty, Ellicott City, MD (US); Alec R. Kerr, Christiansburg, VA (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/305,988

(22) Filed: Aug. 21, 2025

(51) Int. Cl.
*H04L 9/40* (2022.01)
*H04L 41/16* (2022.01)
*H04L 41/22* (2022.01)

(52) U.S. Cl.
CPC .......... *H04L 63/1416* (2013.01); *H04L 41/16* (2013.01); *H04L 41/22* (2013.01)

(58) Field of Classification Search
CPC ...... H04L 63/1416; H04L 41/16; H04L 41/22
See application file for complete search history.

(56) References Cited

U.S. PATENT DOCUMENTS

| | | | |
|---|---|---|---|
| 9,503,421 B2 * | 11/2016 | Liang | G06F 9/4843 |
| 10,445,527 B2 * | 10/2019 | Boehler | H04W 12/03 |
| 10,498,858 B2 * | 12/2019 | Morton | H04L 67/34 |
| 10,635,565 B2 * | 4/2020 | Dang | G06F 18/2433 |
| 10,645,109 B1 * | 5/2020 | Lin | G06N 5/047 |
| 11,194,564 B1 | 12/2021 | Dwivedi et al. | |
| 11,263,229 B1 | 3/2022 | Basavaiah et al. | |
| 11,269,876 B1 | 3/2022 | Basavaiah et al. | |
| 11,968,222 B2 | 4/2024 | Zan et al. | |
| 12,079,233 B1 | 9/2024 | Mishra et al. | |
| 2018/0091528 A1 | 3/2018 | Shahbaz et al. | |
| 2018/0267947 A1 | 9/2018 | Miller et al. | |
| 2020/0042626 A1 | 2/2020 | Curtis et al. | |
| 2020/0175077 A1 * | 6/2020 | Sharan | G06Q 10/063 |
| 2021/0034623 A1 | 2/2021 | Sabhanatarajan et al. | |
| 2022/0116291 A1 | 4/2022 | Hines et al. | |
| 2022/0121689 A1 | 4/2022 | James et al. | |
| 2022/0245091 A1 | 8/2022 | Batsakis et al. | |
| 2024/0430285 A1 | 12/2024 | Almadi | |
| 2025/0106307 A1 | 3/2025 | Wang et al. | |

\* cited by examiner

*Primary Examiner* — Beemnet W Dada
(74) *Attorney, Agent, or Firm* — HUNTON ANDREWS KURTH LLP

(57) ABSTRACT

Systems and methods for integrating components within Security Information and Event Management (SIEM) environments, featuring a data model structure that enhances code reuse and integration efficiency are disclosed. Utilizing an Object Data Model (ODM) for typing input and output parameters, an embodiment of the present invention ensures consistency across operations such as graph-based pivoting, playbook executions, and AI tool interactions. It enables automatic functionality of components across diverse platforms, including SIEM systems, interactive consoles, and AI integrations, thus overcoming traditional platform-specific limitations.

20 Claims, 9 Drawing Sheets

```
from typing import List
from pydantic import BaseModel, Field class Domain(BaseModel):
    value: str = Field(..., description="Domain")

class SMTPDomain(Domain):
    value: str = Field(..., description="SMTP domain")
class ProxyDomain(Domain):
    value: str = Field(..., description="Proxy domain")

class SMTPMessageId(BaseModel):
    value: str = Field(..., description="SMTP message ID")

class SMTPBlocked(BaseModel):
    value: bool = Field(..., description="True if the email was blocked by controls")

def get_smtp_msg_ids_sent_from_smtp_domain(smtp_msg_id: SMTPDomain) -> List[SMTPMessageID]:
    ...

def email_blocked(smtp_msg_id: SMTPMessageID) -> SMTPBlocked:
    ...
```

Figure 3

Case Observables

Selected Row Actions

| ☐ | Type | Observable | Tags |
|---|---|---|---|
| | | filter column ... | filter column ... |
| ☐ | mail | TYZXXXXXXXXXXXXXXXXXXXXXXXXXXXXXXXX751A@TYZP... | smtp_msg_id,pro |
| ☐ | mail | TYZXXXXXXXXXXXXXXXXXXXXXXXXXXXXXXXX751A@TYZP... | smtp_msg_id,pro |
| ☐ | mail | TYZXXXXXXXXXXXXXXXXXXXXXXX1A@TYZP... | smtp_msg_id,pro |
| ☐ | domain | gmail.com | proofpoint_meta |

```
* Action 1
* Action 2
* Action 3
   - Option A
   - Option B
```
710

Figure 7

```
TTK [7] : net.dns.mx.lookup 'companyname.com'

0   mx1.companyname.com
1   mx2.companyname.com
2   mx3.companyname.com
3   mx4.companyname.com dtype: object

TTK [8]
```

Figure 8

TYPED SECURITY INFORMATION AND EVENT MANAGEMENT (SIEM) TRIAGE PROCESSING COMPONENTS SYSTEM

FIELD OF THE INVENTION

The present invention relates generally to Security Information and Event Management (SIEM) systems and more specifically to a SIEM framework that supports typed triage processing components.

BACKGROUND

Security Information and Event Management (SIEM) systems play a crucial role in modern cybersecurity infrastructure. These systems are tasked with collecting, analyzing, and managing security data from across an enterprise to detect and respond to potential threats. As cyber threats become more sophisticated, the need for advanced and adaptable SIEM capabilities has grown significantly.

Traditional SIEM systems often operate as monolithic structures, making it difficult to integrate with various customer-specific environments and datasets. This lack of modularity results in repetitive coding efforts and limits the ability to adapt to evolving security needs.

Current approaches to integrating components into SIEM systems often involve significant coding efforts, requiring developers to rewrite code for each new integration. This process is time-consuming and prone to errors, leading to inefficiencies and increased costs. Moreover, the lack of a standardized data model for processing and typing input and output parameters can result in inconsistencies, further complicating the integration process.

Existing SIEM systems struggle with integration challenges, particularly when attempting to incorporate advanced functionalities such as AI-driven analytics and interactive tooling.

Accordingly, there is a need for an improved system and method for implementing a SIEM framework that supports typed triage processing components for code reuse, enumeration of possible actions, improved integrations and AI enablement.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an embodiment of the present invention, a computer-implemented system implements typed processing components within a security information and event management (SIEM) environment. The computer-implemented system comprises: a computer processor that creates a statically typed function for at least one processing component based on an Object Data Model (ODM) statically-typed function prototype that specifies an input parameter, an output parameter and a descriptive relationship that maps the input parameter to the output parameter and corresponding code which implements the descriptive relationship; a repository that stores and manages the statically typed function for the at least one processing component and enables reuse of the corresponding code; a user interface that enables an analyst user to interact with the at least one processing component; and an integration interface that enables integration of the at least one processing component in a SIEM environment across multiple platforms wherein the integration relates to one or more of: graph-based pivoting, SIEM playbook operations, interactive tooling, artificial intelligence (AI) tool calls or knowledge graphs.

According to another embodiment, a computer-implemented method comprises the steps of: creating, via a computer processor, a statically typed function for at least one processing component based on an Object Data Model (ODM) statically-typed function prototype that specifies an input parameter, an output parameter and a descriptive relationship that maps the input parameter to the output parameter and corresponding code which implements the descriptive relationship; storing and managing, via a repository, the statically typed function for the at least one processing component and enables reuse of the corresponding code; enabling, via a user interface, an analyst user to interact with the at least one processing component; and enabling, via an integration interface, integration of the at least one processing component in a SIEM environment across multiple platforms wherein the integration relates to one or more of: graph-based pivoting, SIEM playbook operations, interactive tooling, artificial intelligence (AI) tool calls or knowledge graphs.

An embodiment of the present invention is directed to a system and method that implements a data model structure designed for seamless integration within SIEM environments. By leveraging an Object Data Model (ODM), an embodiment of the present invention enables consistent typing of input and output parameters across various operations, such as graph-based pivoting, playbook operations, and AI tool calls. This approach promotes and facilitates code reuse and further enhances the reliability and efficiency of the integration process.

Furthermore, an embodiment of the present invention allows components to function automatically across different platforms, including SIEM systems, interactive consoles, and AI integrations. This capability significantly broadens the operational scope of components, overcoming platform-specific limitations and enhancing the adaptability of SIEM systems.

An embodiment of the present invention provides a robust and efficient framework for integrating components into SIEM systems, addressing key challenges in code reuse, consistency, and platform integration, and further improving the functionality and reliability of cybersecurity operations.

The foregoing general description of the illustrative embodiments and the following detailed description thereof are merely exemplary aspects of the teachings of this disclosure and are not restrictive.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

FIG. 3 is an example of a data structure, according to an embodiment of the present invention.

FIG. 7 is an exemplary illustration, according to an embodiment of the present invention.

FIG. 8 is an exemplary illustration, according to an embodiment of the present invention.

DETAILED DESCRIPTION

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention is directed to statically-typed SIEM processing components based on a Object Data Model (ODM) data structure. The innovative approach enables the creation of reusable processing components that may be leveraged across various SIEM functionalities, including graph-based pivoting, automated playbook operations, and a wide range of AI integrations. By statically typing input and output parameters and functional relationships for processing components, an embodiment of the present invention significantly enhances code reuse, reduces redundancy and streamlines integration.

An embodiment of the present invention utilizes an ODM data structure to precisely define data types, such as domains, email addresses, and IP addresses. In addition, domain data types may be subclassed into more specific types, such as email domains or proxy domains. This hierarchical structuring of data types (e.g., Object Oriented Programming (OOP), etc.) enables an embodiment of the present invention to express logic that is applicable only to certain types, thereby enhancing the specificity, accuracy and efficiency of security operations. For example, an SMTP message ID may be used to perform specific actions including looking up email metadata or determining if an email was blocked by controls.

In addition, the Typed SIEM Triage Processing Components System facilitates seamless integrations across various environments by automatically generating the necessary interfaces and tool calls for AI agents. This capability allows for the dynamic construction of agents with appropriate tools to interact with SIEM data, thereby enabling advanced analytics and decision-making processes.

The Typed SIEM Triage Processing Components System significantly enhances the SIEM landscape by providing a robust framework for reusable, statically-typed components. The innovative system addresses the inefficiencies and integration challenges of current SIEM environments and streamlines enhanced automation and AI-driven insights leading to more effective and efficient security management.

An embodiment of the present invention realizes technical benefits including an improved ability to reuse code; an enumeration of possible actions; automation and AI enablement.

An embodiment of the present invention further facilities and provides customer-specific environments for SIEM products as conventional SIEM systems commonly struggle integrating with customer systems and datasets.

Figure 1:
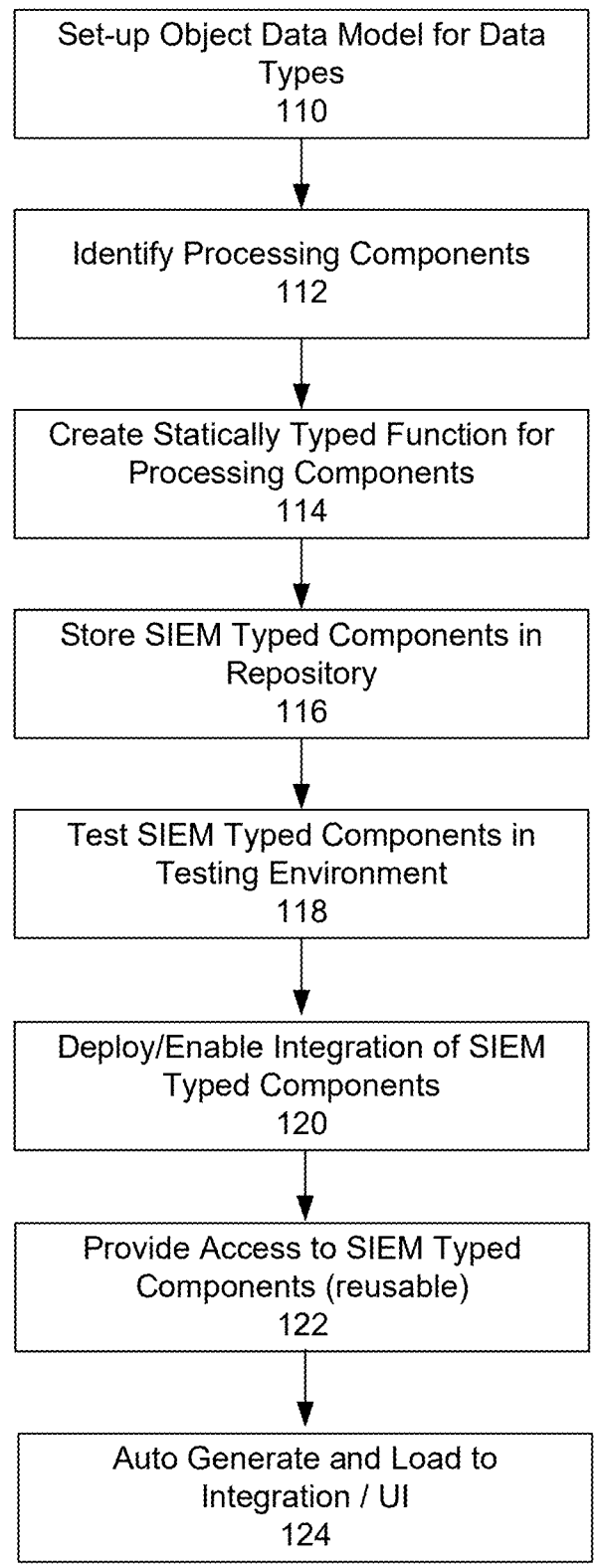
FIG. 1 is an exemplary flowchart, according to an embodiment of the present invention.

FIG. 1 is an exemplary flowchart, according to an embodiment of the present invention. At step 110, an object data model for data types may be initiated or set-up. At step 112, processing components may be identified. At step 114, statically typed functions may be created for each processing component. At step 116, SIEM typed components may be stored in a repository. At step 118, SIEM typed components may be tested in a testing environment. At step 120, SIEM typed components may be available for integration. At step 122, access to SIEM typed components may be provided. At step 124, corresponding integration code and other contextual data may be auto-generated and provided to the integration. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 110, an object data model for data types may be initiated for set-up. An embodiment of the present invention applies a data model structure that enables integration of components into a SIEM system. This structure supports code reuse by eliminating the need to rewrite code for each integration, thereby enhancing efficiency and reducing development time.

An embodiment of the present invention employs an Object Data Model (ODM) for typing input and output parameters of processing components. This ODM is essential for maintaining consistency and reliability across various operations, including graph-based pivoting, playbook operations, interactive tooling, and AI tool calls. The consistent typing provided by the ODM ensures accurate data processing and reduces the likelihood of integration errors. Other data structures and/or modifications may be applied.

At step 112, processing components may be identified. Processing components may relate to SIEM systems and triage environments and work with common data types such as an SMTP message ID (e.g., identifier for a particular email). When an analyst encounters these identifiers, the analyst often performs a set of actions. The set of actions may include: looking up the email metadata, looking up content, determining whether or not the email was proactively blocked by controls, etc. In addition, an embodiment of the present invention may assist newer, less-experience analysts explore data while accessing enumerated possible actions.

With the ODM structure, an embodiment of the present invention allows processing components to be incorporated into SIEM systems without the need for rewriting code, thereby reducing development time and minimizing errors.

At step 114, statically typed functions may be created for each processing component. A statically typed component may represent a processing component that performs a function in programming where the type of each variable, parameter, and return value is explicitly defined before execution, and these types do not change during execution. An embodiment of the present invention enables the use of an ODM (Object Data Model) in typing the input/output parameters of the processing components as it is applied to graph-based pivoting, playbook operations, interactive tooling, and AI tool calls. For example, an AI tool call may involve creating a Model Context Protocol (MCP) server with appropriate tools for pivoting through a SIEM case's data). The typed processing components (or processors) allow for them to be interactively or automatically leveraged when building these systems.

At step 116, SIEM typed components may be stored in a repository. The repository may represent a data storage component that may be local, remote, etc. The repository may be a consolidated single data store, such as Data Store 260. In addition, the repository may represent a distributed collection of multiple storage devices, as shown by 260, 262. The type of storage may be based on the entity, enterprise, industry, application, etc.

At step 118, SIEM typed components may be tested in a testing environment. The testing environment may be available to construct, test, and deploy typed processing components. This may involve using simulated input data of specified types and anticipating output data of corresponding types, contingent upon the implementation of system mocks. This step may be optional.

At step 120, SIEM typed components may be available for integration. Once defined or typed, SIEM typed components may be available for various integrations and operations such as graph-based pivoting, playbook operations, interactive tooling, and AI tool calls.

At step 122, access to SIEM typed components may be provided. An embodiment of the present invention ensures the typed processors may be interactively or automatically leveraged for system building. An embodiment of the present invention allows for automatic functioning of specific code across different platforms, including SIEM systems, interactive consoles, and AI integrations. This tight coupling of components facilitates and enhances the integration capabilities of the system.

At step 124, corresponding code and other contextual data may be auto-generated and provided to the integration. When reusing components across the system, an embodiment of the present invention may build base processing units to operate on specific types of data. When a system encounters a specific type of data, it may determine an available set of actions. This may include possible pivots and lookups. With AI integrations, an embodiment of the present invention may dynamically construct an agent with the appropriate tools to integrate with our SIEM data.

Figure 2:
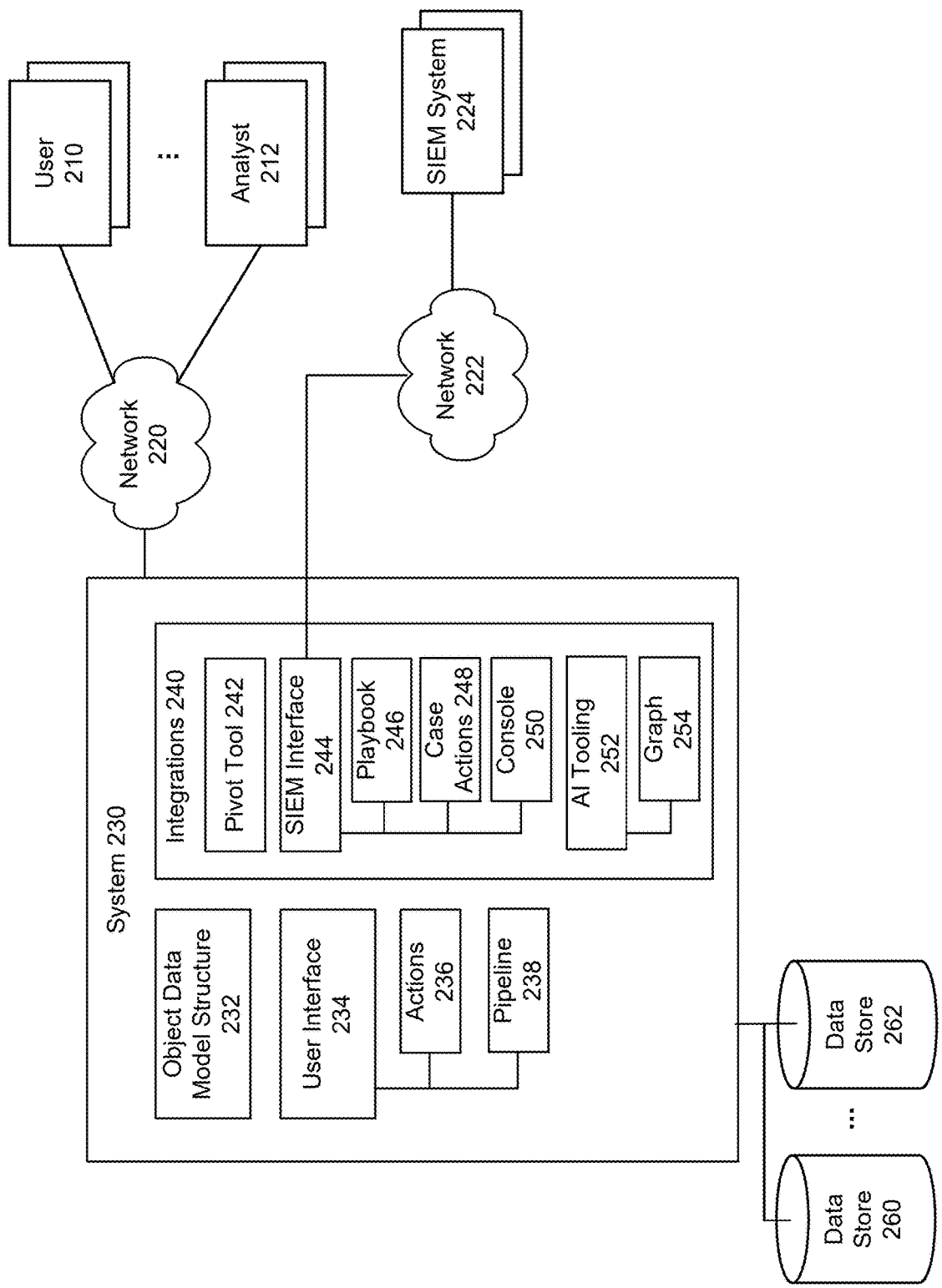
FIG. 2 is an exemplary system diagram, according to an embodiment of the present invention.

FIG. 2 is an exemplary system diagram, according to an embodiment of the present invention. As illustrated in FIG. 2, various Users 210, including Analysts 212, may interact with System 230 through Network 220 via various computing devices. Computing devices may include computers, laptops, workstations, kiosks, terminals, tablets, mobile devices, mobile phones, smart devices, etc.

Network 220 communicates with System 230 that supports Typed SIEM Triage processing components. System 230 may include various modules and components including: Object Data Model Structure 232 and User Interface 234 with Actions 236 and Pipeline 238. System 230 may also support various integrations as shown by Integrations 240 which may include Pivot Tool 242, SIEM Interface 244 with Playbook 246, Case Actions 238 and Console 250 as well as AI Tooling 252 and Knowledge Graph 254. System 230 may be integrated with various environments and system architectures to support a wide range of applications, industries, use cases, etc.

Object Data Model Structure 232 applies a data structure to represent specific cyber data types. For example, a data validation library (e.g., Pydantic, etc.) may be applied to define a data structure. An object type may include domains, email addresses, IP addresses, etc. In addition, the object type (e.g., domains) may be subclassed into more specific types (e.g., email domains, proxy domains, etc.). This provides an ability to express later logic as being applicable only to certain types (e.g., looking up activity in proxy logs for a proxy domain) or more broadly applicable (performing a DNS lookup on any domain).

According to an embodiment of the present invention, SIEM typed components may include a set of attributes including: (1) Input parameter types and descriptions; (2) Output parameter types and descriptions; and (3) Relationship which may further contain: Name of the component; Description of how the input parameters map to output; and Code to produce the output given the input.

According to an embodiment of the present invention, processing components may be implemented as functional relationships, taking ODM structured data as parameters and returning ODM structured return results. A specific component represents a relationship between the input and output data.

For example, an IPV4 DNS lookup component may accept a domain as input and produce an IP as output. According to another example, an MX DNS lookup may consume a domain as input and produce a list of domains as output (representing the mail "MX" servers for that domain). An embodiment of the present invention may perform a check for whether an email was blocked as a component that takes an SMTP message ID as input and produces a Boolean (typed as a SMTPBlocked determination) as output.

FIG. 3 is an example of a data structure, according to an embodiment of the present invention. As shown in FIG. 3, a class may be defined as "Domain" where inputs and outputs may be expressed.

FIG. 3 shows example pivots and auto-enumeration. For example, a case may include an alert containing a phishing email from a domain. The system may determine whether the email was blocked. In this example, alert.smtp_msg_id-email_blocked→whether the email was blocked.

The system may determine whether the sender sent any other emails that were not blocked. In this example, alert.smtp_from's domain-get_smtp_msg_ids_sent_from_smtp_domain→smtp_msg_ids-email_blocked→whether the email was blocked.

By expressing ODM types and components, an embodiment of the present invention supports the ability to reuse the code in various integrations to automatically populate capabilities. For example, an AI agent or component may be able to lookup email block information through automatic tool wrappers. Analysts may interact with an integrated SIEM to directly perform lookups against the case data in front of them through various user interfaces.

User Interface 234 may support various SIEM interactions through Actions 236 and Pipeline 238. An embodiment of the present invention provides the use of statically typed functions in SIEM systems and triage environments that further enable reusable components across several areas of system functionality. Use cases may include: enumeration or possible actions based on the available types of data (as shown by Actions 236); and building drag-and-drop pipeline processing systems of cyber data and/or other interactions and analysis (as shown by Pipeline 238). Other user interactions may be supported.

Integrations 240 may support various integrations using Typed SIEM processing components. The processing components of an embodiment of the present invention may be reused across and integrated into various systems. Integrations 240 may include Pivot Tool 242 to enable data to be explored interactively through specific user actions (e.g., graph-based pivoting tool). Integrations 240 may support a wide range of SIEM user interactions, as shown by Playbook 246, Case Actions 248, Console 250, etc. Integrations 240 may also support various AI features including AI Tooling 252, Knowledge Graph 254, etc.

Pivot Tool 242 may represent a graph-based pivoting tool that enables analysts to explore data by pivoting between different types of data in a graph setting. A force-directed or hierarchical layout of nodes with connected edges may represent a convenient way to visualize and explore relationships between nodes. Nodes represent particular entities/observables/data (e.g., IP address, domain, email address) and edges represent relationships between nodes. With an embodiment of the present invention, SIEM typed components may be reused in various ways where the component relation may represent the graph edge relationship and input/output data and types represent the graph nodes.

Figure 4:
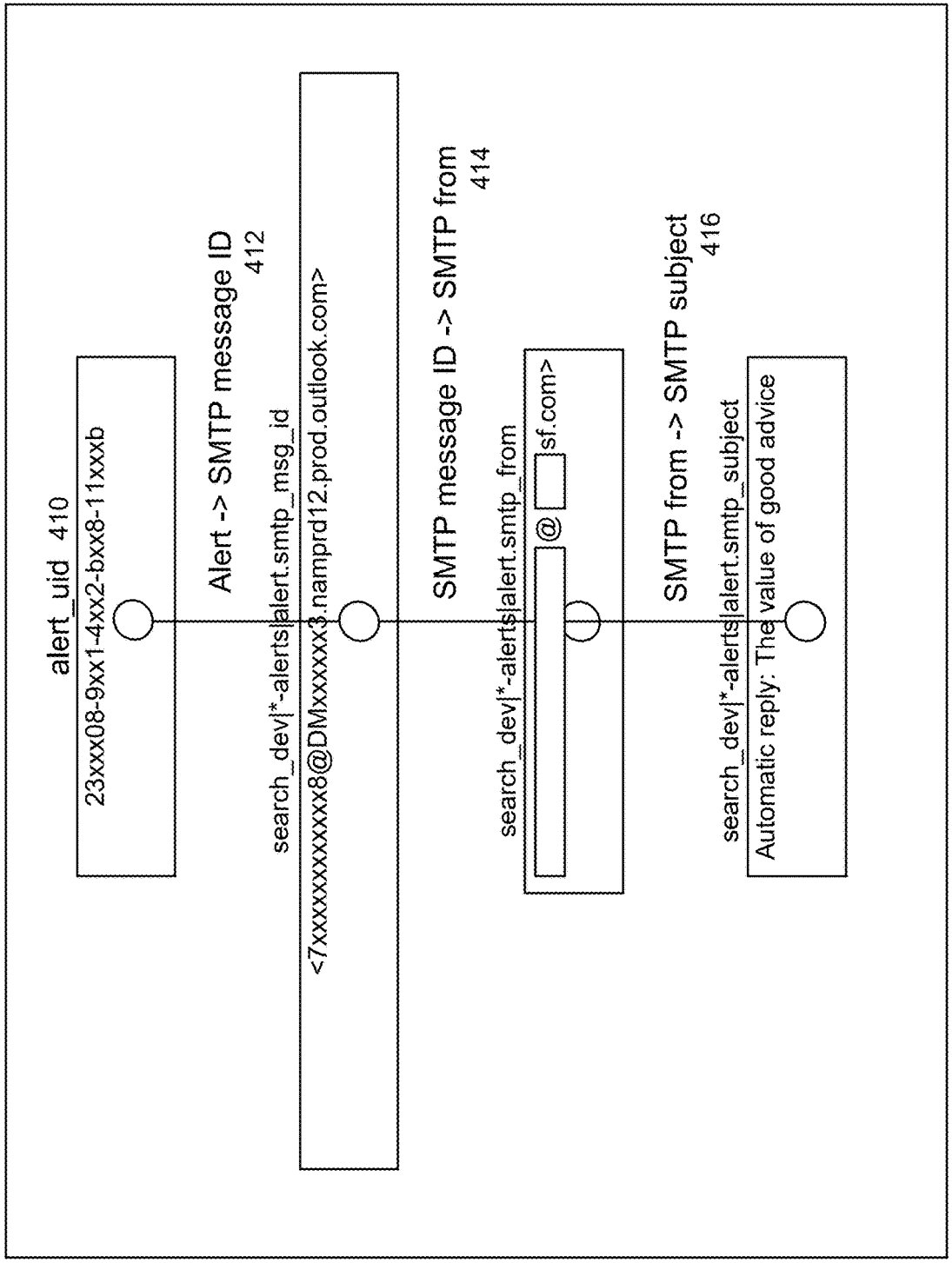
FIG. 4 is an exemplary illustration, according to an embodiment of the present invention.

FIG. 4 is an exemplary illustration, according to an embodiment of the present invention. A user, such as an analyst, may initiate a navigation with an alert_uid, as shown by 410, which may represent an identifier for a particular alert in a SIEM system. Interacting with this alert_uid node, at 410, allows the user to enumerate all the components that may be applied to it. Various user interactions may be supported such as a right click menu or a side canvas which upon selecting a node shows the possible actions available. In this case, a user may then pivot to a SMTP message ID data type which was contained in the alert, as shown by 412. The SMTP message ID uniquely identifies an email, so when a user examines operations that may be performed against it, the user may see that the user may pivot into sensor logs (e.g., email metadata logs) to identify all senders (e.g., SMTP from email address) for that SMTP message ID, as shown by 414. With the new SMTP from node, the user may perform another pivot and see all the SMTP subjects of the emails which contain this SMTP from, as shown by 416. FIG. 4 illustrates a simple node structure. User interactions may be supported by other node structures ranging from simple to complex.

SIEM Interface 244 may interface with SIEM System 224 via Network 222 and support various SIEM interactions including Playbook 246, Case Actions 248, Console 250.

With Playbook 246, SIEM typed components may provide essential building blocks for SIEM playbooks. SIEM playbooks may be constructed based on the type of case or alerts to address a specific triage path and operations analysts should take. These operations may involve performing specific lookups against alerted data types and making decisions based on the results. In addition, operations may be automated (e.g., deterministic with AI chosen parameters, etc.) or integrated playbook operations.

Figure 5:
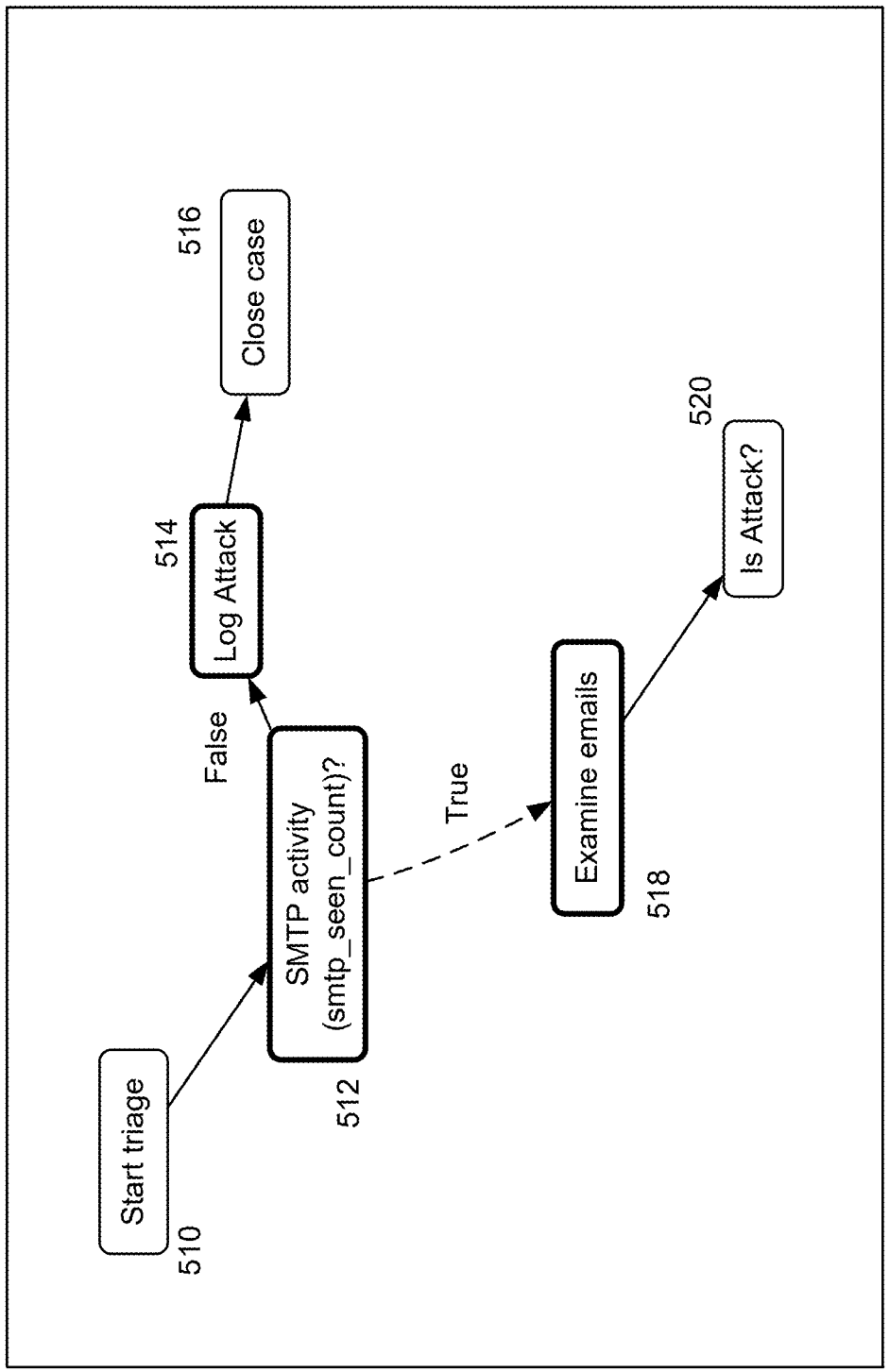
FIG. 5 is an exemplary illustration, according to an embodiment of the present invention.

FIG. 5 is an exemplary illustration, according to an embodiment of the present invention. FIG. 5 illustrates a simple playbook flow that initiates at Start Triage 510. A "SMTP activity" step, as shown by 512, may include: looking up historical SMTP activity based on an alerted domain contained in this playbook's alert. Using SIEM processing components, an embodiment of the present invention may reuse a pivot component that takes SMTP domain input and produces SMTP stats such as a count. As shown by 512, "SMTP activity" includes (smtp_seen_count). The playbook may then express a conditional flow on the result which includes closing the case if the domain has not been seen before. As shown in FIG. 5, if the domain has not been seen, Log Attack 514 may lead to Close Case 516. If the domain has been seen, emails may be examined at 518 and an attack determination may be made at 520.

Figure 6:
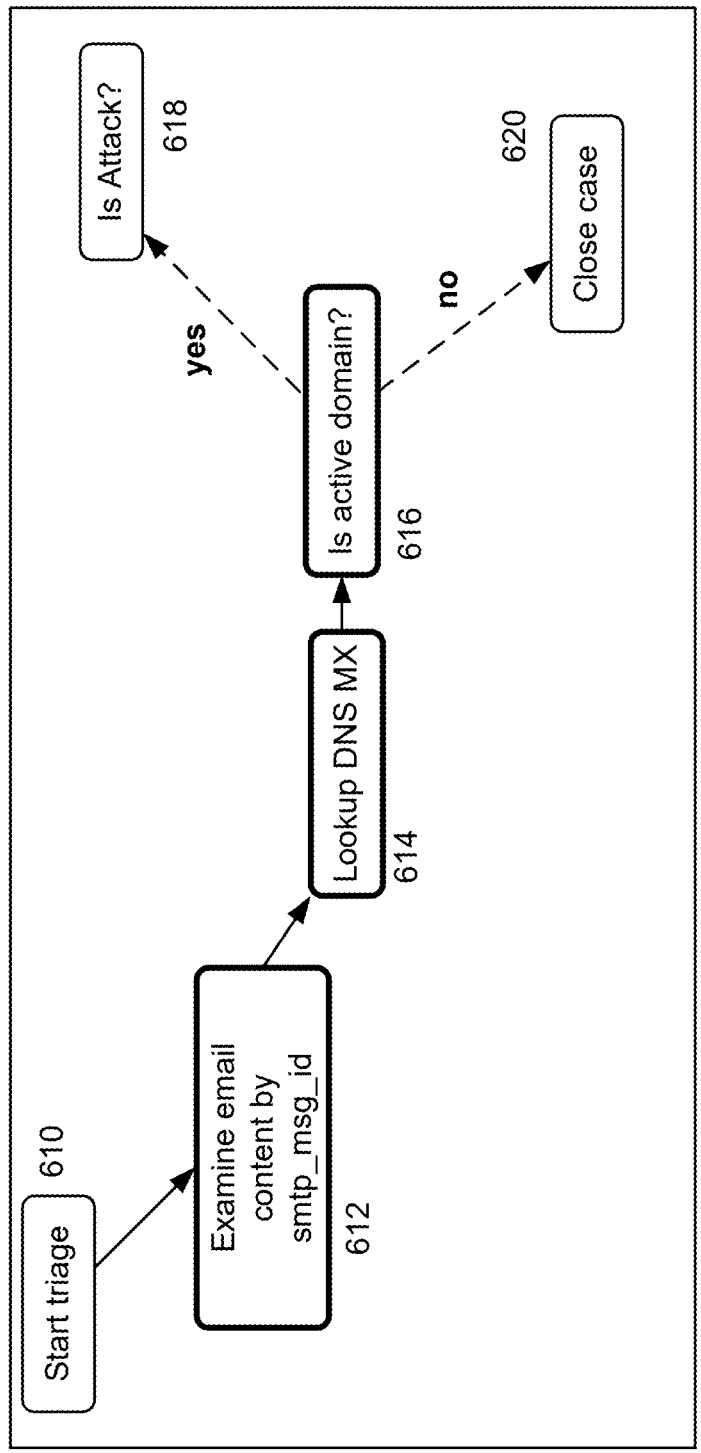
FIG. 6 is an exemplary illustration, according to an embodiment of the present invention.

FIG. 6 is an exemplary illustration, according to an embodiment of the present invention. FIG. 6 illustrates another playbook flow that initiates at Start Triage 610. At 612, email content is examined by smtp_msg_id. In this example, a Lookup DNS MX component 614 takes a SMTPDomain data type as input (from 612), performs a DNS MX lookup (as shown by 614), and generates a list of domains of email servers (List [Domain]) as an output. At 616, whether the domain is active or not may be determined. As shown in FIG. 6, the playbook may then conditionally handle the triage flow if the MX lookup produced results (active domain), as shown by 618, or did not (inactive domain), as shown by 620. FIGS. 5 and 6 illustrate simple playbook flows. An embodiment of the present invention may support other flows ranging from simple to complex.

Case Actions 248 may support interactive case actions. Within SIEM cases, canvas actions may be performed on case data. For instance, SIEM case observables may include typed data (e.g., observed email addresses, SMTP message IDs, domains, file hashes, etc.). Performing an interaction (e.g., right clicking, other menu actions) on a types data item may be used to run SIEM typed components that work with that data type.

FIG. 7 is an exemplary illustration, according to an embodiment of the present invention. FIG. 7 illustrates a canvas interface. In this example, a triage analyst presented with case observables as shown in FIG. 7 in the form of three SMTP message IDs may perform an interaction (e.g., right click, etc.) as shown by 710 and then run a lookup to determine whether the email was blocked, and then be presented with the result of running the SIEM typed component.

An embodiment of the present invention automatically enumerates applicable SIEM typed components based on input types. For instance, when a domain is identified, an embodiment of the present invention may determine which SIEM typed components can accept a domain as input. In addition, the user interface may be automatically populated with relevant actions, allowing analysts to execute these actions against the domain with an interaction (e.g., a single click), thereby streamlining the analysis process.

According to an embodiment of the present invention, Interactive Console Commands provide an ability to explore data and perform analysis. According to an exemplary illustration, a console may include an iPython-based environment where commands may be run and data may be programmatically manipulated. An embodiment of the present invention may enable reuse of SIEM typed components to automatically create commands and support enumeration of commands based on available data types.

By utilizing SIEM typed components with defined relationships between data types and their corresponding operations, an embodiment of the present invention may automatically populate user interfaces with possible actions an analyst may perform on a given data type. In addition, analysts may be presented with a comprehensive array of lookup and pivot options, along with the potential output types these actions may generate. Accordingly, analysts may strategically navigate through the data, selecting paths that will lead them to the necessary insights and solutions.

FIG. 8 is an exemplary illustration, according to an embodiment of the present invention. FIG. 8 illustrates an exemplary console environment that supports typed SIEM components, according to an embodiment of the present invention. For example, a MX lookup component takes SMTPDomain as input and produces List [Domain] as output may represented in a console environment.

In this example, the console environment may represent an IPython-based interactive environment with a suite of predefined commands. These commands may be developed by analysts to facilitate consistent interaction with data and SIEM systems. These commands require specific inputs and produce corresponding outputs, consistent with the SIEM typed components. The interactive console serves as a platform for executing these commands, displaying data via the console presentation layer, and enabling programmatic data manipulation.

For example, DNS MX lookup commands may be hierarchically structured where network-related commands are prefixed under "net," followed by "dns" for DNS-specific commands, resulting in a precise MX record lookup command (e.g., net.dns.mx). This lookup command accepts a domain as input and outputs a list of domains and also provides a basis for further programmatic interaction within the interactive console.

In addition, analysts may programmatically interact with the console through various actions. For example, analysts may employ a FOR-loop to iterate over the domains and execute additional functions, such as cross-referencing each domain with asset inventory data. Furthermore, if executing a query results in the generation of numerous email message IDs, analysts may utilize another command to ascertain which emails were not blocked by iterating over each ID.

AI Integration may include AI Tooling 252 and Knowledge Graph implementations, as shown by 254.

AI Tooling 252 may represent AI tool calling which is an important primitive for AI agents to be able to take actions such as performing lookups. The SIEM typed components provide the ability to automatically generate tools for AI integration. For example, applicable toolsets may be automatically converted into agent tools and MCP servers. AI toolkits may need the following: Tool name; Tool description; Tool input parameters; Tool return types; and Python function which implements the tool. With an embodiment of the present invention, SIEM typed components contain corresponding attributes that enable automatic generation of sets of tools.

Figure 9:
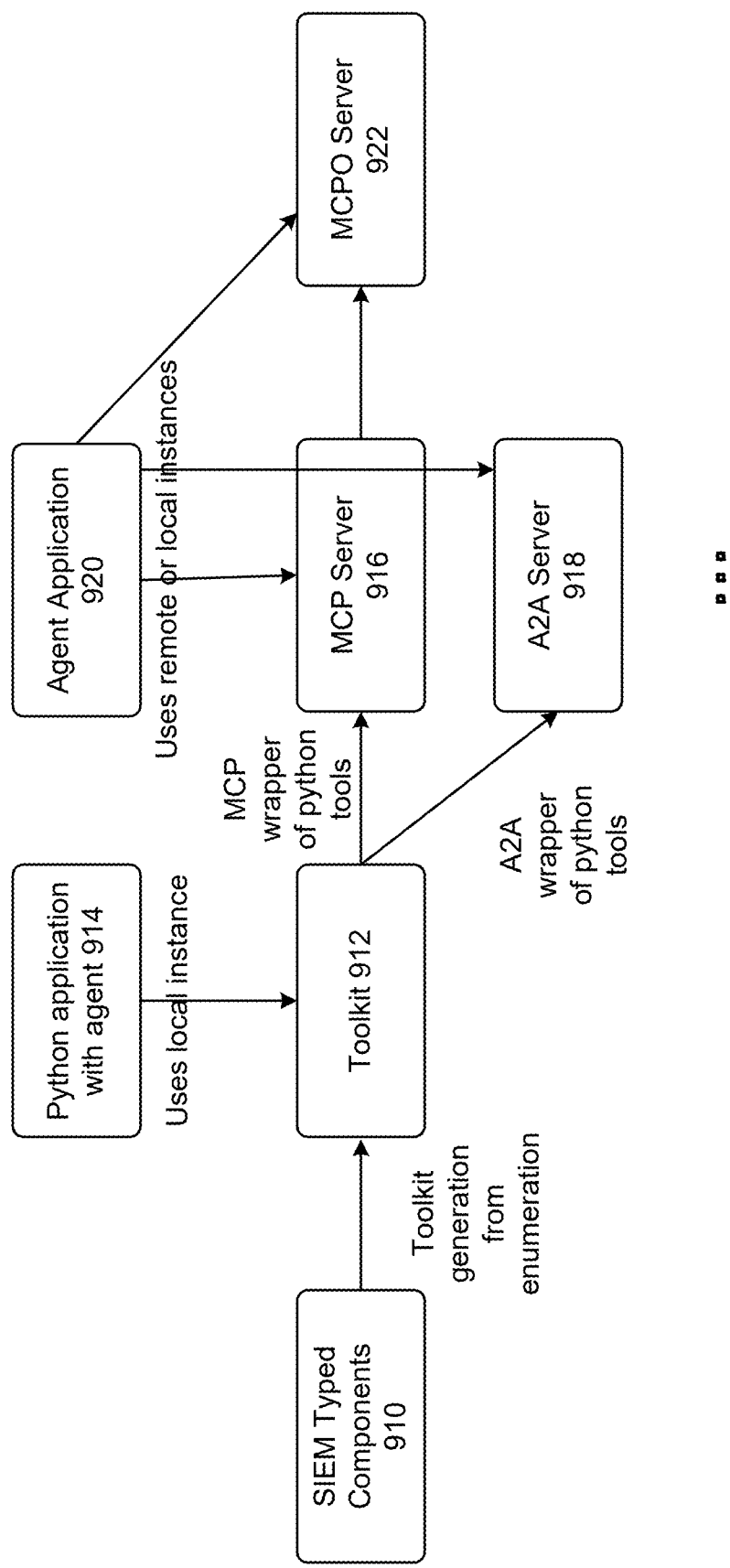
FIG. 9 is an exemplary illustration, according to an embodiment of the present invention.

FIG. 9 is an exemplary illustration, according to an embodiment of the present invention. SIEM typed components 910 may be used in AI Toolkit 912, which may include Python Agno Toolkit. Python application with Agent 914 may access AI Toolkit using a local instance. MCP wrapper of python tools may be provided to MCP Server 916 whereas an A2A wrapper of python tools may be provided to A2A Server 918. A2S Server 918 may represent an Agent2Agent server that receives and processes tasks from client agents and returns results or status updates. Other servers may be implemented. Agent application 920 may use remote or local instances. MCP Server 916 may further communicate with proxy server, such as MCPO Server 922.

Similarly to the graph pivot explorer discussed above, SIEM typed components may be used to represent relationships in AI Knowledge Graphs, represented at 254 in FIG. 2. In addition, typed data may be used to represent nodes. With an entire set of SIEM typed components, an embodiment of the present invention may initialize an AI knowledge graph system with a well-defined schema in addition to code/tools necessary to populate it with real data.

With an embodiment of the present invention, AI knowledge graphs may be dynamically generated, offering AI agents a structured approach to storing information within a graph-based relationship database where nodes represent data entities and edges denote the relationships between them. With pre-defined relationships offered by typed SIEM components, an embodiment of the present invention may translate established relationships and data types into a comprehensive knowledge graph schema, streamlining AI operations and enhancing its ability to interact effectively with data.

The various embodiments of the present invention may realize technical benefits including enhancing integration, efficiency, and functionality of components within SIEM systems. Key technical benefits include Code Reuse; Consistent Typing, Seamless Integration, etc.

An embodiment of the present invention supports code reuse by providing a data model structure that allows components to be integrated without the need to rewrite code for each new addition. This reduces development time and effort, leading to increased efficiency.

An embodiment of the present invention provides consistent typing with an Object Data Model (ODM) data structure ensuring consistency across various operations such as graph-based pivoting and AI tool calls. The consistent typing reduces errors and enhances the reliability of data processing.

An embodiment of the present invention enables components to function automatically across different platforms, including SIEM systems, user interfaces, interactive consoles, etc. This seamless integration capability overcomes platform-specific limitations and broadens the operational scope of processing components. Accordingly, an embodiment of the present invention contributes to a more efficient, reliable, and adaptable SIEM system, capable of meeting the evolving demands of cybersecurity operations.

The system components illustrated in the Figures above are exemplary and illustrative and may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

The systems illustrated above may be implemented in a variety of ways. Architecture within the illustrated systems may be implemented as hardware components (e.g., module) within one or more network elements. It should also be appreciated that architecture within the systems may be implemented in computer executable software (e.g., on a tangible, non-transitory computer-readable medium) located within one or more network elements. Module functionality of architecture within the systems may be located on a single device or distributed across a plurality of devices including one or more centralized servers and one or more mobile units or end user devices. The architecture depicted in the systems is meant to be exemplary and non-limiting. For example, while connections and relationships between the elements of the systems are depicted, it should be appreciated that other connections and relationships are possible. The systems described above may be used to implement the various methods herein, by way of example. Various elements of the systems may be referenced in explaining the exemplary methods described herein.

Connections illustrated in the Figures above may represent networks including wireless network, a wired network or any combination of wireless network and wired network. Networks may further include one, or any number of the exemplary types of networks operating as a stand-alone network or in cooperation with each other. Networks may utilize one or more protocols of one or more network elements to which it is communicatively coupled. Networks may translate to or from other protocols to one or more protocols of network devices. Although the connections in the Figures may be depicted as one network for simplicity, it should be appreciated that according to one or more embodiments, Networks may comprise a plurality of interconnected networks, such as, for example, a service provider network, the Internet, a cellular network, corporate networks, or even home networks, or any of the types of networks mentioned above.

Data may be transmitted and received via networks utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While the Figures above illustrate individual devices or components, it should be appreciated that there may be several of such devices to carry out the various exemplary embodiments. Systems may communicate using any mobile or computing device capable of sending or receiving network signals.

Systems may be communicatively coupled to various local and remote storage components. These storage components may include any suitable data structure to maintain the information and allow access and retrieval of the information. The storage may be local, remote, or a combination. The storage components may have back-up capability built-in. Communications with the storage components may be over a network or communications may involve a direct connection between the various storage components, as depicted in the Figures above. The storage components may also represent cloud or other network based storage.

Those skilled in the art will appreciate that the diagrams discussed above are merely examples of a system and a method for implementing typed SIEM processing components and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, .NET, Python, Java, Modula-2, Pascal, Prolog, REXX, Visual Basic, JavaScript and other languages. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system for implementing typed processing components within a security information and event management (SIEM) environment comprising:
    a computer processor that creates a statically typed function for at least one processing component based on an Object Data Model (ODM) statically-typed function prototype that specifies an input parameter, an output parameter and a descriptive relationship that maps the input parameter to the output parameter and corresponding code which implements the descriptive relationship;
    a repository that stores and manages the statically typed function for the at least one processing component and enables reuse of the corresponding code;
    a user interface that enables an analyst user to interact with the at least one processing component; and
    an integration interface that enables integration of the at least one processing component in a SIEM environment across multiple platforms wherein the integration relates to one or more of: graph-based pivoting, SIEM playbook operations, interactive tooling, artificial intelligence (AI) tool calls or knowledge graphs.

2. The computer-implemented system of claim 1, wherein the user interface provides an enumeration of possible processing components based on an available data type in response to an interaction enabling user selection of at least one of the possible processing components.

3. The computer-implemented system of claim 1, wherein the user interface enables pipeline processing interactions for related cyber data in response to an interaction with the at least one processing component.

4. The computer-implemented system of claim 1, wherein the graph-based pivoting integration enables an analyst to explore data interactively by pivoting using the at least one processing component across typed data.

5. The computer-implemented system of claim 1, wherein the graph-based pivoting integration provides an enumeration of a set of applicable actions using a hierarchical layout of processing components based on applicable input data types matching a selected node's data type.

6. The computer-implemented system of claim 1, wherein the SIEM playbook operations utilize the at least one processing component to perform specific lookups and make decisions based on alerted data types.

7. The computer-implemented system of claim 1, wherein the AI tool calls automatically convert applicable processing components into one or more agent tools.

8. The computer-implemented system of claim 1, wherein the at least one processing component is configured to automatically populate one or more capabilities for AI integrations, enabling one or more AI agents to perform one or more actions using an automatically assembled toolset.

9. The computer-implemented system of claim 1, wherein the interactive tooling comprises a console for running commands that enable programmatic manipulation of data using the at least one processing component.

10. The computer-implemented system of claim 1, wherein an AI knowledge graph is automatically created using the descriptive relationship as representing one or more edges and ODM typed data as representing one or more nodes.

11. A computer-implemented method for implementing typed processing components within a security information and event management (SIEM) environment comprising the steps of:
    creating, via a computer processor, a statically typed function for at least one processing component based on an Object Data Model (ODM) statically-typed function prototype that specifies an input parameter, an output parameter and a descriptive relationship that maps the input parameter to the output parameter and corresponding code which implements the descriptive relationship;
    storing and managing, via a repository, the statically typed function for the at least one processing component and enables reuse of the corresponding code;
    enabling, via a user interface, an analyst user to interact with the at least one processing component; and
    enabling, via an integration interface, integration of the at least one processing component in a SIEM environment across multiple platforms wherein the integration relates to one or more of: graph-based pivoting, SIEM playbook operations, interactive tooling, artificial intelligence (AI) tool calls or knowledge graphs.

12. The computer-implemented method of claim 11, wherein the user interface provides an enumeration of possible processing components based on an available data type in response to an interaction enabling user selection of at least one of the possible processing components.

13. The computer-implemented method of claim 11, wherein the user interface enables pipeline processing interactions for related cyber data in response to an interaction with the at least one processing component.

14. The computer-implemented method of claim 11, wherein the graph-based pivoting integration enables an analyst to explore data interactively by pivoting using the at least one processing component across typed data.

15. The computer-implemented method of claim 11, wherein the graph-based pivoting integration provides an enumeration of a set of applicable actions using a hierarchical layout of processing components based on applicable input data types matching a selected node's data type.

16. The computer-implemented method of claim 11, wherein the SIEM playbook operations utilize the at least one processing component to perform specific lookups and make decisions based on alerted data types.

17. The computer-implemented method of claim 11, wherein the AI tool calls automatically convert applicable processing components into one or more agent tools.

18. The computer-implemented method of claim 11, wherein the at least one processing component is configured to automatically populate one or more capabilities for AI integrations, enabling one or more AI agents to perform one or more actions using an automatically assembled toolset.

19. The computer-implemented method of claim 11, wherein the interactive tooling comprises a console for running commands that enable programmatic manipulation of data using the at least one processing component.

20. The computer-implemented method of claim 11, wherein an AI knowledge graph is automatically created using the descriptive relationship as representing one or more edges and ODM typed data as representing one or more nodes.

* * * * *